(12) United States Patent
Santos et al.

(10) Patent No.: US 7,527,437 B2
(45) Date of Patent: May 5, 2009

(54) SENSOR MOUNTING STRUCTURE WITH LIGHT PIPE

(75) Inventors: Roberto S. Santos, Hudson, MA (US); Patrick Joseph Delaney, III, Sudbury, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 218 days.

(21) Appl. No.: 11/240,019

(22) Filed: Sep. 30, 2005

(65) Prior Publication Data

US 2007/0074591 A1 Apr. 5, 2007

(51) Int. Cl.
*G02B 6/36* (2006.01)
*G02B 6/00* (2006.01)

(52) U.S. Cl. .............................. 385/93; 385/14; 385/88

(58) Field of Classification Search ................... 385/93; 250/522.1; 362/576, 581
See application file for complete search history.

(56) References Cited

U.S. PATENT DOCUMENTS

| | | | |
|---|---|---|---|
| 1,895,179 A | 1/1933 | Thresher | |
| 2,497,456 A | 2/1950 | Johnson | 74/424.8 |
| 2,791,905 A | 5/1957 | Cheney | |
| 3,010,363 A | 11/1961 | Malfeld | 88/40 |
| 3,213,189 A | 10/1965 | Mitchell et al. | |
| 3,281,660 A | 10/1966 | Studenick | |
| 3,354,302 A | 11/1967 | Greasley | 240/8.16 |
| 3,576,563 A | 4/1971 | Scott et al. | 340/380 |
| 3,750,466 A | 8/1973 | Ott et al. | |
| 4,262,181 A | 4/1981 | Tufano et al. | 200/296 |
| 4,505,054 A | 3/1985 | Clark et al. | 33/357 |
| 4,510,408 A | 4/1985 | Jovick et al. | 310/168 |
| 4,515,336 A | 5/1985 | Fischer | 248/288.3 |
| 4,633,081 A | 12/1986 | Hiramatu | |
| 4,798,964 A | 1/1989 | Schmalfuss et al. | |
| 4,805,455 A | 2/1989 | DelGiorno et al. | |

(Continued)

FOREIGN PATENT DOCUMENTS

DE 19626291 A1 1/1998

(Continued)

OTHER PUBLICATIONS

MH15: Short housing, clever mounting—for smart solutions Data Sheets, SICK AG.

(Continued)

*Primary Examiner*—Frank G Font
*Assistant Examiner*—Ryan Lepisto
(74) *Attorney, Agent, or Firm*—Whyte Hirschboeck Dudek; William R. Walbrun (57) ABSTRACT

A sensing device mounting mechanism, and related method of operating such a mechanism, are disclosed. In at least some embodiments, the mechanism can include a housing that is mountable to a support structure. The housing can define an interior for receiving and supporting a sensing device. The mechanism further includes light pipe device coupled to the housing. The light pipe device can be used to communicate light from a light source to the sensing device, or from the sensing device to a location exterior of the housing such that it can be viewed, detected or received by an operator or other device. Advantageously, the sensing device mounting mechanism is constructed so as to enhance and facilitate, as opposed to interfere with, proper performance of the sensing device.

23 Claims, 3 Drawing Sheets

U.S. PATENT DOCUMENTS

| | | |
|---|---|---|
| 5,195,364 A | 3/1993 | Dehe et al. |
| 5,205,042 A | 4/1993 | Greter et al. |
| 5,412,816 A | 5/1995 | Paterson et al. |
| 5,542,859 A | 8/1996 | Ison et al. ............... 439/536 |
| 5,617,762 A | 4/1997 | Kirsch .................. 74/490.06 |
| 5,621,370 A | 4/1997 | St. Louis ................. 337/380 |
| 5,806,955 A | 9/1998 | Parkyn, Jr. et al. ............ 362/31 |
| 5,938,310 A * | 8/1999 | Leaman et al. ................ 362/26 |
| 5,954,310 A | 9/1999 | Soldo et al. ................ 248/660 |
| 5,966,991 A | 10/1999 | Gosselin et al. .......... 74/490.01 |
| 6,025,963 A | 2/2000 | Hippenmeyer et al. ...... 359/819 |
| 6,033,100 A * | 3/2000 | Marquiss et al. ............ 362/581 |
| 6,147,820 A | 11/2000 | Anselment et al. .......... 359/823 |
| 6,204,501 B1 | 3/2001 | Cutler ....................... 250/352 |
| 6,244,107 B1 | 6/2001 | Nelson et al. ................ 73/431 |
| 6,318,694 B1 | 11/2001 | Watanabe .................. 248/371 |
| 6,322,275 B1 | 11/2001 | Schmidt et al. .............. 403/14 |
| 6,352,037 B1 | 3/2002 | Doyle ......................... 108/20 |
| 6,360,999 B1 | 3/2002 | Liao ......................... 248/27.1 |
| 6,441,361 B1 | 8/2002 | Bennett, Jr. et al. ......... 250/221 |
| 6,550,679 B2 | 4/2003 | Hennick et al. ............. 235/454 |
| 6,599,049 B2 | 7/2003 | Erben ......................... 403/27 |
| 6,614,601 B2 | 9/2003 | Dallakian .................. 359/804 |
| 6,632,008 B2 | 10/2003 | Kalkbrenner ............... 362/554 |
| 6,720,884 B2 | 4/2004 | O'Connor et al. ........ 340/643.6 |
| 6,760,206 B2 | 7/2004 | Daharsh et al. ............ 361/93.1 |
| 6,799,376 B1 | 10/2004 | Voeller et al. |
| 6,858,172 B2 | 2/2005 | Daharsh et al. ........ 264/272.14 |
| 6,892,594 B2 | 5/2005 | Buck et al. ................. 73/866.5 |
| 6,937,812 B2 | 8/2005 | Schladenhauffen et al. . 385/146 |
| 7,256,891 B2 | 8/2007 | Domack et al. |
| 2003/0211041 A1 | 11/2003 | Ezratty et al. |
| 2004/0031385 A1 | 2/2004 | Neuhaeuser ..................... 92/5 |
| 2004/0049353 A1 | 3/2004 | Ezratty |
| 2004/0175988 A1 | 9/2004 | Chang et al. |
| 2005/0263964 A1 | 12/2005 | Kumoi |

FOREIGN PATENT DOCUMENTS

| | | |
|---|---|---|
| EP | 0037896 B1 | 2/1985 |
| FR | 2531568 A1 | 2/1984 |
| GB | 2311805 A | 10/1997 |
| JP | 62236742 A | 10/1987 |
| WO | 97/48578 A | 12/1997 |

OTHER PUBLICATIONS

EC Declaration of Conformity, SICK.
Photoelectric Sensors, Accessories, p. 638, 2000 Edition, SICK.
SMB18S Swivel Mount Bracket datasheet, Oct. 2002., Banner.
Sensor Accessories Sensor Mounting Brackets data sheets, pp. 1-3, Eaton Cutler-Hammer, Jun. 2004.
Installation Accessories data sheets, Micro Detectors, Jan. 2003.
Sensor Brackets and Accessories 2004-2005 (link to pdf file), http://www.softnoze.com/catalog.cfm.
ProxPort™ Mount & Conversion Brackets datasheet, Softnoze USA, Inc.
Swivel-style Universal Brackets (SUB) datasheet, Softnoze USA, Inc.
Accessories—Cables and Connectors—Brackets, pp. 740-754, Banner Engineering Corp., www.bannerengineering.com.
Fixing Brackets and Supports, Sensor Accessories, ST Series datasheets, Datasensor.
Photoswitch® Photoelectric Sensors, Introduction, pp. R1-17 to R1-19, Allen-Bradley.
Photoswitch® Photoelectric Sensors, Accessories, Contents, pp. 1-374 to 1-379, Allen-Bradley.
Sentek Econorush Sensor Holder, Sentek Limited UK, http://www.sentek.co.uk/econrush.htm.
Rosheim, Mark E., Mechanical Design of an Omni-Directional Sensor Mount abstract, http://www.stormingmedia.us/04/0448/A044804.html.

* cited by examiner

SENSOR MOUNTING STRUCTURE WITH LIGHT PIPE

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to sensing devices and, more particularly, relates to various mechanisms, structures and/or methods for mounting sensing devices onto other structures.

BACKGROUND OF THE INVENTION

Sensing devices of many different types are commonly employed in a variety of environments and applications. Sensing devices encompass a broad spectrum of devices including, for example, various light-sensing devices such as laser-sensing devices, light sensing devices that are capable of distinguishing among different colors of visible light, and devices for sensing various other types of radiation including infrared radiation or heat, microwave radiation, and x-ray radiation. Additionally, other sensing devices include, for example, devices that are capable of sensing the position of other structures, acoustic sensors, vibration sensors, motion sensors such as accelerometers, orientation sensors involving gyroscopes, and numerous other types of sensing devices.

Sensing devices are employed in a wide variety of industrial, commercial, military, residential and other environments and applications. For example, in industrial environments, light sensors are often employed in conjunction with conveyor systems/assembly line structures. Such light sensors are often used to detect the presence of objects moving down an assembly line and to determine whether a given object has entered or exited a particular region of the assembly line. Light sensors of similar design can also be used in residential applications, for example, in connection with garage door openers. Also for example, in many commercial facilities as well as residential homes, various sensing devices are used in security systems in order to detect the presence of potential intruders within or nearby those facilities or homes. Sensing devices can further be implemented on vehicles, for example, to detect the presence of objects behind vehicles. Indeed, sensing devices are ubiquitous in today's modern world.

Although in some cases sensing devices are free-standing, typically sensing devices are mounted upon or in relation to other supporting structures. Further, in many if not most circumstances, it is desirable that the sensing devices be mounted in relation to such supporting structures in a fixed manner, or at least in a manner by which the location and orientation of a given sensing device relative to the supporting structure(s) is known or predictable. For example, in the case of a light sensing device implemented in a manufacturing assembly line, it is typically desired that the light sensing device be fixedly orientated in a particular direction so as to be aligned to receive a light beam from a light source located elsewhere. The mounting of light sensing devices in other environments, such as in the case of garage door openers, similarly can entail the careful, fixed positioning of the sensing devices.

Notwithstanding the above discussion, in some other circumstances, it is not so critical that the positioning of sensing devices in relation to the structures on which they are mounted be finely adjustable. In some of these circumstances, accurate positioning of the sensing devices simply is not necessary, for example, in the case of the mounting of some vibration sensors or acoustic sensors. Also, in some circumstances, even where accurate positioning of the sensing devices is important, the structures on which the sensing devices are intended to be mounted are designed or manufactured in a manner such that the accurate positioning of the sensing devices can be reliably achieved so long as the sensing devices are mounted upon the other structures in a standardized manner. This can be the case, for example, where the structures on which the sensing devices are to be mounted are designed and manufactured to meet or exceed tolerances that are equal or better than the tolerances that must be met in positioning the sensing devices in order for the sensing devices to function properly.

Still another consideration in the mounting of sensing devices with respect to supporting structures is whether the intermediate mechanism or support component existing between the sensing device and the supporting structure inhibits or interferes with any operation of the sensing device. To the extent that any intermediate mounting mechanism might get in the way of a signal (e.g., block a light pathway), such mechanism could interfere with proper performance of a sensing device and for that reason would be undesirable. Stated another way, it would be desirable to provide an intermediate mounting mechanism that does not prevent or limit the sending of an indicator signal.

For at least these reasons, therefore, it would be advantageous if improved mounting mechanisms or structures for use in mounting sensing devices to other support structures could be developed. In particular, it would be advantageous if, in at least some embodiments, such improved mounting mechanisms facilitated the accurate positioning of sensing devices with respect to other support structures in a manner that allowed for reliable and accurate positioning. Additionally, in at least some embodiments, it would be desirable if such improved mounting mechanisms facilitated the simple and quick installation of sensing devices without the use of many small parts or cumbersome tools. Further, in at least some embodiments, it would be advantageous if the sensing device mounting mechanism would be constructed so as to enhance and facilitate, as opposed to interfere with, proper performance of a sensing device, including for example, the reception of signals by the device and/or the provision of an output signal by the device.

BRIEF SUMMARY OF THE INVENTION

The present inventor has recognized that a variety of improved mounting devices or mechanisms for mounting sensing devices to supporting structures could be developed. More particularly, the present inventor has recognized that, in at least some embodiments, the mechanism can include a housing that is mountable to a support structure. The housing can define an interior for receiving and supporting a sensing device. The mechanism further includes a light pipe device coupled to the housing. The light pipe device can be used for communicating a light signal from a location external to the housing to the sensing device, and/or from the sensing device to the location exterior to the housing. For example, in at least some cases, the light pipe can be used to communicate a light signal from a sensing device to an individual or device positioned exterior of the housing. Alternatively, in at least some cases, the light pipe device can be used to communicate a light signal from a light source external to the housing to the sensing device.

Additionally, in at least some embodiments, the present invention relates to a mounting device configured for mounting a sensing device in relation to a supporting structure. In at least some embodiments, the mounting device can have a housing that further includes a stem portion and a flange portion extending from the stem portion and wherein mounting device housing can be mounted to the support structure by passing the stem portion through an orifice in the support structure until the flange portion substantially abuts the supporting structure. Additionally, in at least some embodiments, the stem portion can further include a snapping mechanism for securing the mounting assembly to the support structure via snap-fit engagement. Further, in at least some embodiments, the mounting assembly can include a light pipe device coupled to the housing.

In some additional embodiments, the present invention relates to the combination of a sensing device with a sensing device mounting mechanism, where the sensing device is located within the interior a housing of the mounting mechanism. In at least some such embodiments, the sensing device includes a light source or other indicator light. Also, in at least some embodiments, the sensing device includes a printed circuit board coupled to a plurality of components including a light emitting diode.

Further, in at least some embodiments, the housing of the sensing device mounting mechanism can include a stem portion and a flange portion extending from the stem portion and the stem portion can further include a main portion and a hinged portion that is hingedly coupled to the main portion. Also, in at least some embodiments, the housing can comprise a stem portion having a plurality of interior snapping mechanisms and a flange portion having a plurality of interior snapping mechanisms and the stem portion interior snapping mechanisms and the flange portion interior snapping mechanisms can engage complementary notches formed in the sensing device so as to secure the sensing device within the interior of the housing. And still further, in at least some embodiments, the housing can include a stem portion, a flange portion extending from the stem portion, and an end cap portion, and the end cap portion can include a pair of snapping mechanisms for snap fit engagement with the stem portion.

Further, in at least some embodiments, the present invention relates to a method associated with a sensing device mounting mechanism having a housing mountable to a supporting structure, where the housing defines an interior for receiving and supporting a sensing device, and a light pipe device coupled to the housing. The method includes communicating light from at least one of the interior of the housing to an exterior of the housing, and from the exterior of the housing to the interior of the housing, by way of the light pipe device that is coupled to the housing.

DETAILED DESCRIPTION OF THE PREFERRED EMBODIMENT

Figures 1, 2:
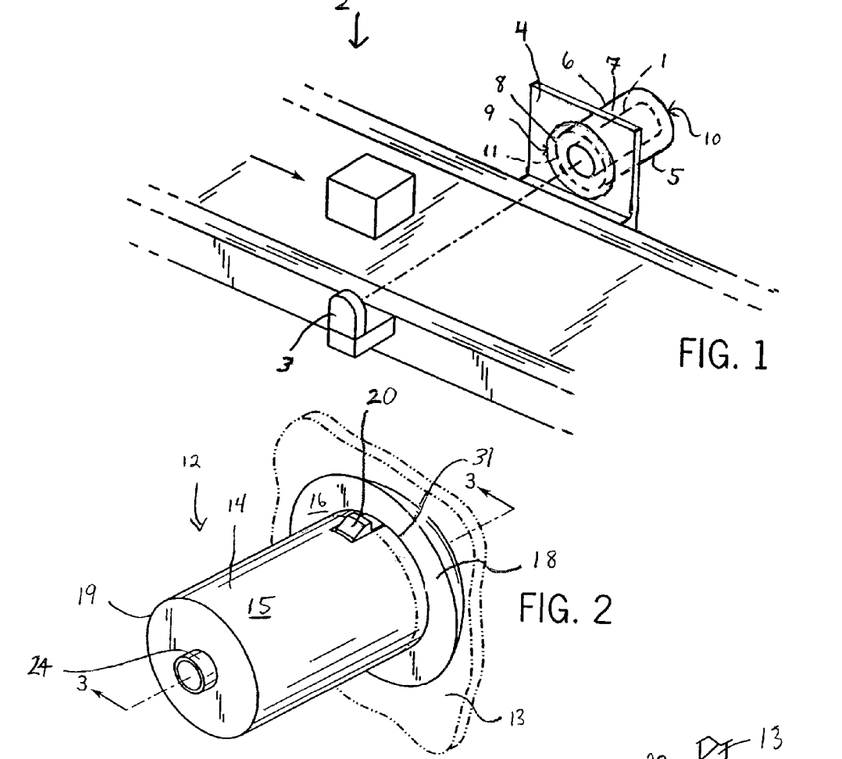
FIG. 1 is a perspective view of a sensing device mounting mechanism in accordance with at least one embodiment of the present invention, with the mounting mechanism implemented in one exemplary manufacturing application.
FIG. 2 is a reverse perspective view of a sensing device mounting mechanism including a light pipe device, similar to that of FIG. 1, in accordance with at least one embodiment of the present invention.

Referring to FIG. 1, a sensing device 1 is shown to be implemented in one exemplary application, namely, a conveyor system 2 as is often found in manufacturing and other commercial facilities implemented in assembly lines or the like. The sensing device 1 in the present embodiment is a light sensing device capable of receiving and detecting the presence of a light beam (e.g., a laser beam) emitted by a light source 3 located on the opposite side of the conveyor system 2. Stated another way, the light sensing device 1 is aligned with a light emitting device 3. The sensing device 1 in particular is mounted onto a supporting structure 4 of the conveyor system 2 by way of a mounting mechanism 5.

Exemplary applications for the light sensing device arrangement of FIG. 1 can include, for example, "transmitted beam" or "through beam" applications. However, other applications, including but not limited to "retroreflective" and "diffuse" applications, are known and considered to be within the scope of present invention. In the context of a retroreflective application, for example, the sensing device 1 would both emit and detect light that was reflected off of a target reflector that can be positioned where the light source 3 is located. Similarly, in the context of a diffuse application, the sensing device 1 would both emit and detect light that was reflected off of the object to be sensed (i.e., without the use of a light source positioned where the light source 3 is shown to be located).

Although the mounting mechanism 5 (as well as the supporting structure 4 and the sensing device 1) can have a variety of different structural forms and shapes depending upon the embodiment, FIG. 1 shows the mounting mechanism 5 to have a generally mushroom-shaped exterior housing 6 including a substantially cylindrical stem portion 7 and a flange portion or flange 8 extending outward from the stem portion. Housing 6 includes first and second ends, 9 and 10, respectively. In the embodiment shown, the mounting mechanism 5 is positioned onto the supporting structure 4, which is a panel (or other substantially flat flange or wall of low to moderate thickness), by inserting the second end 10 of the housing 6 through a complementary orifice within the supporting structure 4 and passing the stem portion 7 through the orifice up until the flange 8 abuts the supporting structure.

Although in the present embodiment the mounting mechanism 5 and sensing device 1 are arranged such the mounting mechanism 5 protrudes outward from the supporting structure 4 away from the light source 3, and such that the sensing device 1 receives signals entering at the first end 9 of the housing, in alternate embodiments the mounting mechanism 5 and sensing device 1 could be arranged in an opposite manner relative to the panel-type supporting structure, e.g., where signals entered at the second end 10 of the housing. Further, while in the present embodiment the flange 8 includes a circular or disc-shaped flange surface 11 for abutting the supporting structure 4, the flange could also be of a rectangular shape or other arbitrary shape. Additionally, while in the present embodiment, and throughout the figures, the mounting mechanism 5 employs the substantially cylindrical stem portion 7, in alternate embodiments the mounting mechanism could have an outer surface of arbitrary shape (e.g., the mounting mechanism could have a box-shaped outer surface). Further, although the present embodiment envisions that the mounting mechanism 5 would be fully secured to (e.g., fixed in relation to) the supporting structure, the present invention also encompasses certain embodiments that could allow for some relative (e.g., sliding or rotational) motion between the mounting mechanism 5 and the supporting structure 4.

Although the sensing device 1 of FIG. 1 is a light sensing device, it should be understood that embodiments of the present invention are intended to be applicable with respect to numerous different types of sensing devices including, for example, other light-sensing devices (e.g., color-sensing devices, etc.), devices for sensing various other types of radiation (e.g., infrared, microwave, x-ray, etc.), position-sensing devices, acoustic sensors, vibration sensors, motion sensors such as accelerometers, orientation sensors involving gyroscopes, and numerous other types of sensing devices. Also, while FIG. 1 shows the sensing device 1 to be implemented in connection with the conveyor system 2, it should be understood that embodiments of the present invention are intended to be applicable with respect to the mounting of a variety of different types of sensing devices onto a variety of different supporting structures in a variety of different industrial, commercial, military, residential and other environments and in connection with a variety of different applications.

FIG. 2 is a reverse perspective view a sensing device mounting mechanism 12 mounted onto a supporting structure 13, similar to that of FIG. 1, in accordance with at least one embodiment of the present invention. Referring to FIG. 2, although the mounting mechanism 12, as well as the supporting structure 13 and the sensing device (not shown), can have a variety of different structural forms and shapes depending upon the embodiment, FIG. 2 shows the mounting mechanism 12 again to have a generally mushroom-shaped exterior housing 14 including a substantially cylindrical stem portion 15 and a flange portion 16 (also referred to herein as a "flange") protruding outward from the stem portion 15 at a first end 31 of the stem portion. The flange portion 16 includes a generally circular disc-shaped surface 18 that extends from the stem portion, and the disc-shaped surface substantially abuts the supporting structure 13 when the mounting mechanism is mounted and ready for use. As with the FIG. 1 embodiment, the mounting mechanism 12 is positioned onto the supporting structure 13, which is a panel (or other substantially flat flange or wall of low to moderate thickness), by inserting a second end 19 of the housing 14 through a complementary orifice within the supporting structure 13 and passing the mounting mechanism 12 through the orifice up until the disc-shaped surface 18 substantially abuts the supporting structure.

The mounting mechanism 12 can be secured in relation to the supporting structure 13 in A variety of ways. As illustrated, in one embodiment, the housing 14 of the mounting mechanism 12 further includes at least one snapping mechanism (which can take any of a variety of shapes and sizes), generally referred to by numeral 20, for securing the mounting mechanism to the supporting structure 13 via a snap-fit engagement, with or without an angular offset relative to the supporting structure, as described in more detail in co-pending U.S. patent application Ser. No. 11/240,175, entitled "Sensor Mounting Structure with Snapping Feature" filed on even date herewith, which is hereby incorporated by reference herein. In further embodiments, the mounting mechanism 12 can be attached to the supporting structure 13 in a variety of other ways. For example, the mounting mechanism can include two housing portions that are slidable relative to each other and that each include appendages(s) such that, when the housing portions are appropriately slide relative to one another, the appendages apply opposing forces to opposite sides of the supporting structure so as to grasp or clamp onto that structure. Such embodiments are described in more detail in, for example, co-pending U.S. patent application Ser. No. 11/240,033, entitled "Sensor Mounting Structure with Adjustable Swivel Ball and Panel Mounting Mechanism" filed on even date herewith, which is hereby incorporated by reference herein.

While in the present embodiment the mounting mechanism 12 and sensing device (not shown in FIG. 2) are arranged such the mounting mechanism 12 protrudes outward from the supporting structure 13 and the sensing device receives signals entering at the first end 31 of the housing 14, in alternate embodiments the mounting mechanism 12 and sensing device could be arranged in an opposite manner relative to the panel-type supporting structure (e.g., where signals entered at the second end 19 of the housing). Further, while in the present embodiment the flange 16 includes a flange disc-shaped surface 18 having a circular profile, the flange could also include a rectangular shape or other arbitrary shape. Additionally, while in the present embodiment the mounting mechanism 12 employs a cylindrical stem portion 15, in alternate embodiments the mounting mechanism could have a housing 14 of arbitrary shape (e.g., the mounting mechanism could have a box-shaped outer surface). Further, although the present embodiment envisions that the mounting mechanism 12 would be fully secured to (e.g., fixed in relation to) the supporting structure 13, the present invention also encompasses certain embodiments that could allow for some relative (e.g., sliding or rotational) motion between the mounting mechanism 12 and the supporting structure. Additionally, while not illustrated as such, the mounting mechanisms of the present invention can include an angular offset, which is described in the U.S. Patent Application entitled "Sensor Mounting Structure with Snapping Feature" referenced above.

Still referring to FIG. 2, the mounting mechanism 12 further includes a light pipe device 24 (also referred to herein as a "light pipe") that is coupled or joined to the housing 14. In one embodiment, the light pipe is integral with the housing. As used herein, "light pipe" and "light pipe device" refer to a device that can be used to communicate light from one location to another. Such light pipes can include light source(s) that are sending light signals to a given sensing device (e.g., the light source 3 discussed above), as well light source(s) that are included as part of the sensing device (or otherwise supported within the housing 14 or in relation to the sensing device) and are employed to provide output signal(s) representative of various quantities, for example, representative of the levels of signals received by the sensing device or information as to the operational status of the sensing device.

In some embodiments, for example, a light pipe could conduct light signals provided by one or more light emitting diodes (LEDs), lasers, light bulbs, fiber optic cables, liquid crystal displays (LCDs) (e.g., alphanumeric displays), and/or other devices to a sensing device or from a sensing device, e.g., where such device(s) were implemented as part of the sensing device and intended to communicate signal(s) to locations exterior of the sensing device. Further, in the case of an LCD display mounted on the sensing device, it is possible that the light pipe would both communicate light from the exterior of the housing to the LCD display, and then further conduct reflected light back to the exterior to allow for the information on the LCD display to be conducted to an operator or device outside of the housing.

Thus, in connection with the sensing device mounting mechanisms, a light pipe can serve to channel light either from one or more indicator light sources on the sensing device to a location outside of the mounting mechanism so as to enhance and improve visibility of the light to an observer outside the mounting mechanism, or to channel light from the outside into the sensing device. The light pipe device often is designed to magnify or focus a light signal such as that provided by one or more LED's or other indicator lights that can be located inside of the housing 14, so that the signal(s) can be received or viewed by an operator positioned exterior of the housing (i.e., outside of the mounting mechanism). While ordinarily designed to conduct light in the visible spectrum, in some alternate embodiments a light pipe can also be used to conduct light outside the visible range (e.g., infrared light).

Figure 3:
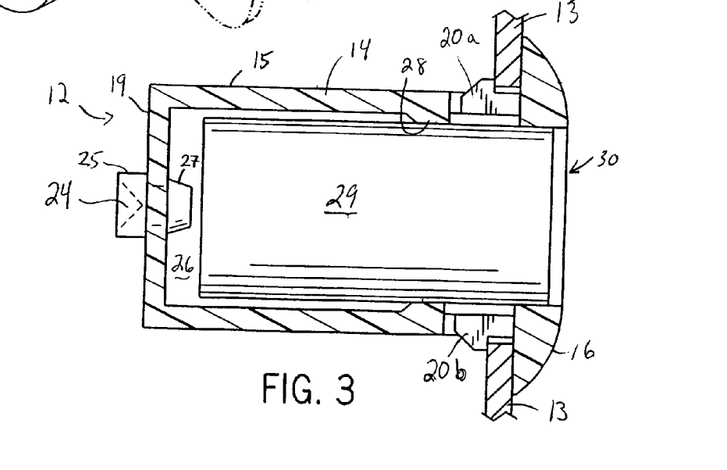
FIG. 3 is a cross-sectional view of the sensing device mounting mechanism taken along line 3-3 of FIG. 2.

FIG. 3 is a cross-sectional view of the sensing device mounting mechanism 12 taken along line 3-3 of FIG. 2. In the present embodiment, the mounting mechanism 12 again is shown to include generally mushroom-shaped housing 14 having substantially cylindrical stem portion 15 and flange portion 16. Light pipe device 24 is shown coupled to the housing 14, and includes a hollow, substantially cylindrical extension portion 25 that extends outwardly from the second end 19 of the housing 14 and a frustoconical portion 27 that protrudes into an interior 26 of the housing. Also as shown, the mounting mechanism 12 is secured (as noted above with respect to FIG. 2) to supporting structure 13 by a plurality of snapping mechanisms 2*a-b*. In the present embodiment, snapping features 20*a-b* are integral with the housing, although this is not required. Moreover, as a practical matter, the number, position, size and shape of the snapping mechanism(s) can vary to convenience.

Housing 14 further includes sensing device engagement extension rim 28 for receiving and securing a sensing device 29 within the interior 26. More specifically, as shown, the sensing device 29 and the sensing device engagement extension rim 28 are in press-fit engagement with each other. Although not shown, in an alternative embodiment the extension rim 28 can comprise a dove tail-type mechanism that could slidably engage a slot created in a surface of the sensing device 29. In the present embodiment, sensing device 29 is positioned within the interior 26 of housing 12 via orifice 30 formed within flange portion 16. Still, the manner in which the sensing device is secured can vary to convenience, as can the structure(s) employed to do so. For example, the extension rim might take the form of discrete protrusions, as opposed to a continuous rim structure as shown in the present embodiment. Also, for example, the sensing device (or a structure on which it is supported) could be mounted on a swivel ball supported within the housing, as described in U.S. patent application Ser. No. 11/240,033, entitled "Sensor Mounting Structure with Adjustable Swivel Ball and Panel Mounting Mechanism" mentioned above, or supported by a rotatable yoke or set of springs, as described in co-pending U.S. patent application Ser. No. 11/240,034, entitled "Sensor Mounting Structure Allowing for Adjustment of Sensor Position" filed on even date herewith, which is hereby incorporated by reference herein.

Figure 4:
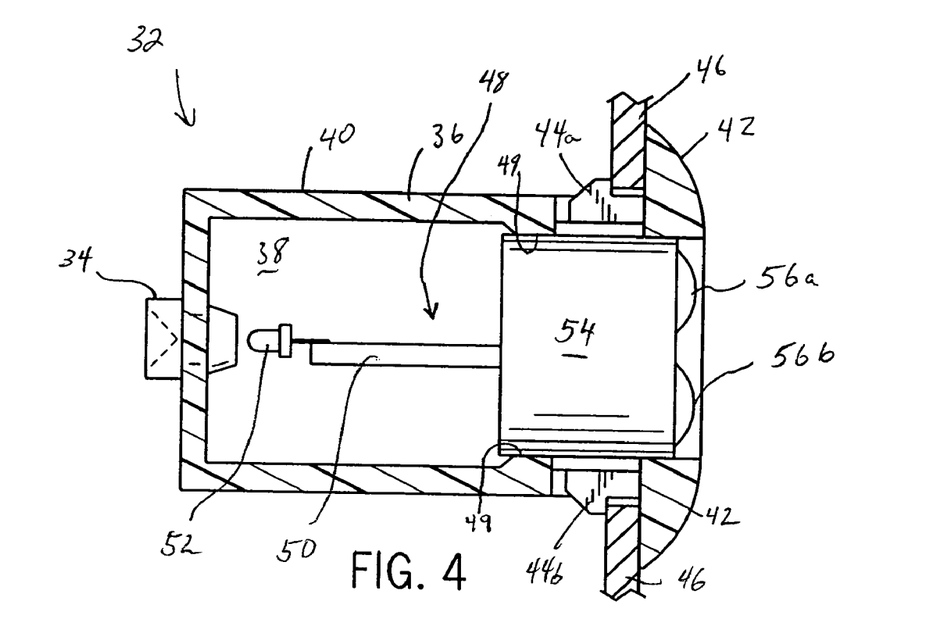
FIG. 4 is a cross-sectional view, similar to that of FIG. 3, showing another sensing device mounting mechanism including a light pipe device in accordance with at least one embodiment of the present invention.

FIG. 4 is a cross-sectional view, similar to that of FIG. 3, showing another sensing device mounting mechanism 32 including a light pipe 34 in accordance with at least one embodiment of the present invention. In the present embodiment, the mounting mechanism 32 again includes a housing 36 defining an interior 38, and the housing includes a substantially cylindrical stem portion 40 and a flange portion 42, as well as snapping features 44*a-b*. Mounting mechanism 32 is mounted, so as to be secured via snap-fit engagement, to supporting structure 46, as described above with respect to the embodiment illustrated in FIGS. 2 and 3. A sensing device 48 is positioned within the interior 38 of housing 36 as described above with respect to FIGS. 2-3, and is further secured via a press-fit, using extension rim 49. Although not shown, in an alternative embodiment the extension rim 49 can comprise a dove tail-type mechanism that could slidably engage a slot created in a surface of the sensing device 48. Sensing device, generally referred to by numeral 48, is assembled from a plurality of components. More specifically, the sensing device includes a printed circuit board (or "PCB") 50 that is used to couple various electronic components of the device 48. One or more LED's 52 (e.g., leaded or surface mount LED's) are located on one side of the PCB 50, while a optics holder or carrier 54 (typically housing optical sensors along with a transmitter) are located on the other side of the PCB. Lenses 56*a-b* are used to focus light for use by the sensing the device 48. An optical shield (not shown) may be included to substantially prevent the sensing device 29 from being contaminated with light from extraneous sources (e.g., other than from a target area). The sensing device 49 is configured to provide output signals via the LED's 52 based upon the light signals received at the optics carrier 54. The light pipe 34 serves to magnify the light from the LED so as to make the signals more visible to an operator monitoring the sensing device, or for provision to another destination (e.g., onto a fiber optics cable).

Figure 5:
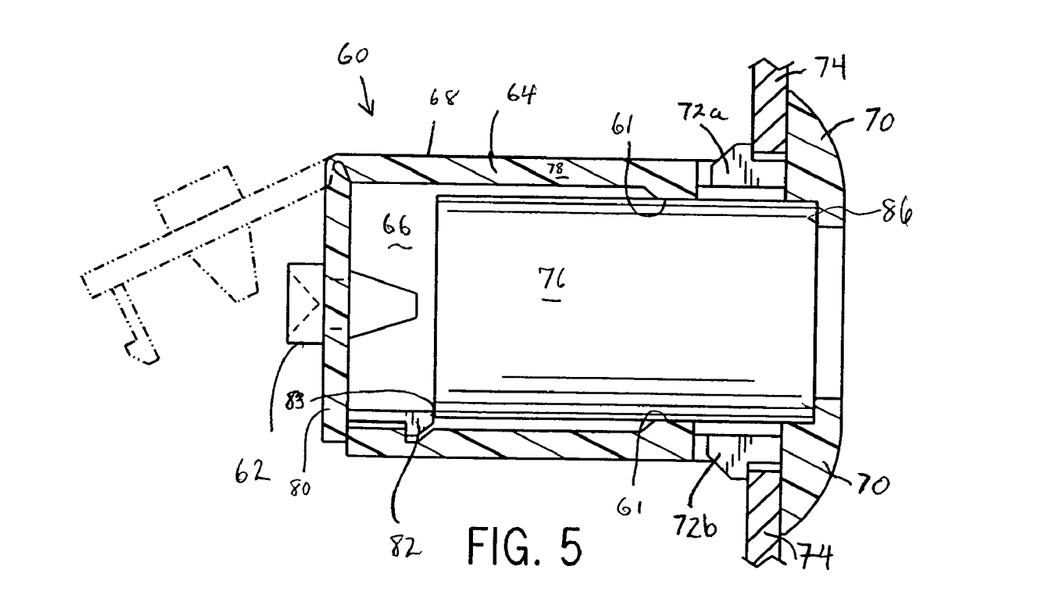
FIG. 5 is a cross-sectional view, similar to that of FIG. 3, showing another sensing device mounting mechanism including a light pipe device in accordance with at least one embodiment of the present invention.

FIG. 5 is a cross-sectional view, similar to that of FIG. 3, showing another sensing device mounting mechanism 60 including a light pipe 62 in accordance with at least one embodiment of the present invention. In the present embodiment, the mounting mechanism 60 again includes a housing 64 defining an interior 66. The housing 64 includes a substantially cylindrical stem portion 68 and a flange portion 70, as well as snapping mechanisms 72*a-b*. Here again, mounting mechanism 60 is mounted or coupled, so as to be secured via snap-fit engagement, to support structure 74, as described above with respect to the embodiment illustrated in FIGS. 2 and 3.

In the present embodiment, stem portion 68 of housing 64 includes a main portion 78 and a hinged portion 80 that is hingedly coupled to the main portion. The light pipe 62 is coupled, as shown, to the hinged portion 80. In one embodiment, the light pipe 62 can be formed such that it is mounted on (or even integral with) the hinged portion 80. Hinged portion 80 further includes a snapping mechanism 82 for snap-fit engagement with the main portion 78 when the sensing device 76 is positioned within the housing interior 66 and the mounting mechanism 60 is its mounted position, ready for use.

In the embodiment of FIG. 5, the sensing device 76 is again positioned within the interior 66 of housing 64 and is further secured via a press-fit, using housing extension rim 61. However, in the present embodiment, the sensing device 76 is placed into position within the interior 66 of the housing by raising hinged portion 80 to an open position (shown in phantom) and sliding, or otherwise positioning, the sensing device into the interior. Advantageously, the flanged portion 70 includes one or more stops 86, which serve to further secure the sensing device. The hinged portion 80 can be rotated and locked (via the snap fit) to a closed position (shown), which typically coincides with its position when the mounting mechanism 60 is in its mounted position. End 83 of snapping mechanism 82 is used to properly position the sensing device within the housing 64. Although not shown, in an alternative embodiment the extension rim 61 can comprise a dove tail-type mechanism that could slidably engage a slot created in a surface of the sensing device 76.

Figure 6:
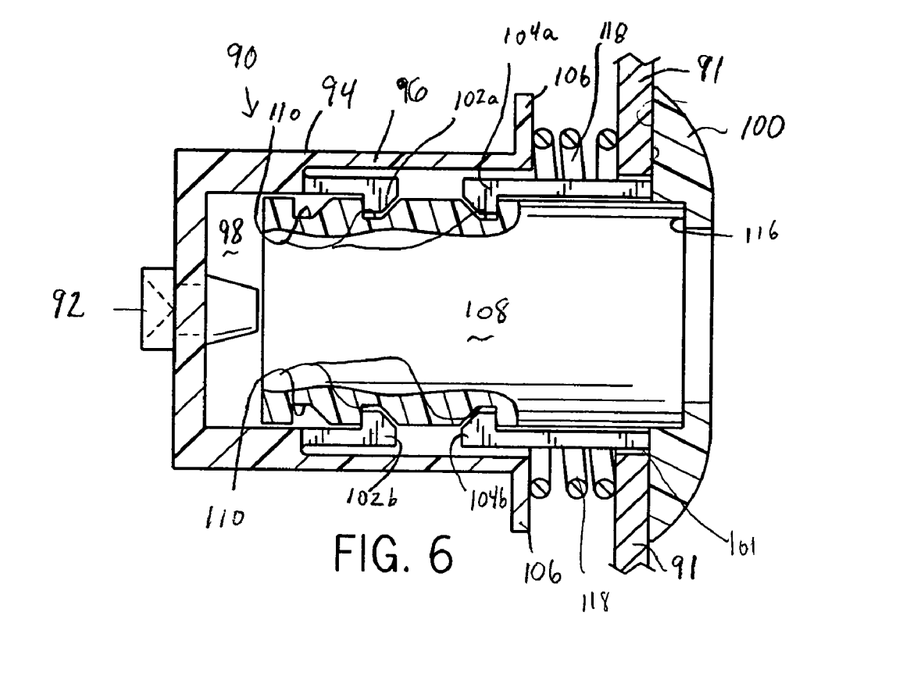
FIG. 6 is a cross-sectional view, similar to that of FIG. 3, showing another sensing device mounting mechanism including a light pipe device in accordance with at least one embodiment of the present invention.

FIG. 6 is a cross-sectional view, similar to that of FIG. 3, showing still another sensing device mounting mechanism 90 including a light pipe 92 in accordance with at least one embodiment of the present invention. In the present embodiment, the mounting mechanism 90 again includes a housing 96 defining an interior 98. Further, in the present embodiment, the housing 96 includes two component portions, a stem portion 94 and a mushroom-like flange portion 100. Stem portion 94 includes interior snapping mechanisms 102a-b, and flange portion 100 includes interior snapping mechanisms 104a-b. Here again, the size, shape, quantity and position of interior snapping mechanisms can vary to convenience. Stem portion 94 further includes disc-shaped extension rim 106. A sensing device 108 is again positioned within the interior 98 of housing 96.

Further, as shown, a sensing device 108 includes a plurality of notches or grooves 110 For receiving interior snapping mechanisms 102a-b and 104a-b of stem and flange portions 94, 100, respectively, to secure the sensing device when mounted. In one embodiment, the notches 110 can be formed in a slot (not shown) so as to be positioned, one in front of another, in linear fashion. Mounting mechanism 90 is further shown to include a spring 118, although while the spring is shown, it should be understood that a piece of foam, rubber, or other material having similar cushioning and/or spring-like characteristics, can be used in place of, or in conjunction with, the spring(s) as desired. In an alternative embodiment, the spring 118 could be replaced by leaf spring-type elements that may be either integrally molded to the stem portion rim 106, or attached to the stem portion rim 106 as a separate piece. Exemplary leaf spring-type elements, as well as various uses of such elements, are described in U.S. patent application Ser. No. 11/240,034, entitled "Sensor Mounting Structure Allowing For Adjustment Of Sensor Position".

The sensing device 108 can be mounted onto supporting structure 91 by using the mounting mechanism 90 in the following manner. Flange portion 100 can be fit or passed through orifice 101 of support structure 91 so that the flange portion and supporting structure abut or substantially abut one another. Flange portion fits over or around the sensing device 108, and the interior snapping mechanisms, 102a-b snap into corresponding notches 110 on the sensing device so as to lock the sensing device in place relative to the flange portion 100. The spring 118 is then slid over the sensing device 108 such that the spring is positioned in overlay relationship with respect to the sensing device, e.g., the spring fits concentrically around the flange portion 100 (and particularly around snapping mechanisms 104a-b), which surrounds the sensing device. Moreover, stem portion 98 is then slid over the sensing device 108. When the stem portion 98 slides over the sensing device 108, spring 118 is compressed by the rim 106 against the supporting structure 91 until interior snapping mechanisms 102a-b engage, via a snap-fit, complementary sensing device notches 110. Advantageously, the flange portion 100 includes one or more stops 116, which serve to further secure the sensing device 108 relative to the flange portion. Sensing device 108, as a result, is positioned in a mounted position. Once compressed, the spring 118, pushes the stem portion 94 away from the support structure 91, and thereby acts as a tensioning device to hold, in cooperation with the interior snapping mechanism 102a-b and the snapping mechanisms 104a-b, the sensing device and mounting mechanism in a mounted position.

Figure 7:
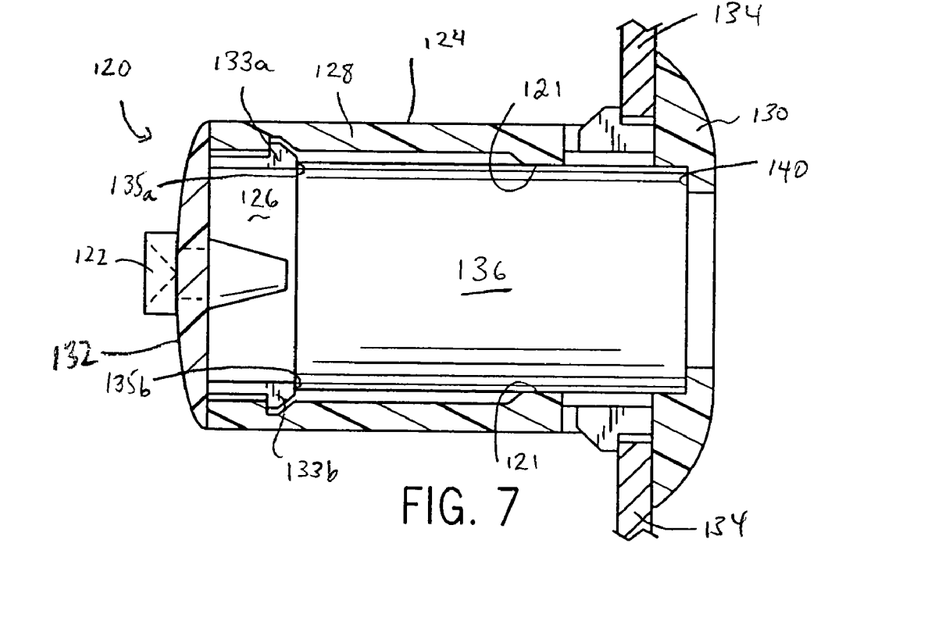
FIG. 7 is a cross-sectional view, similar to that of FIG. 3, showing another sensing device mounting mechanism including a light pipe device in accordance with at least one embodiment of the present invention.

FIG. 7 is a cross-sectional view, similar to that of FIG. 3, showing another sensing device mounting mechanism 120 including a light pipe 122 in accordance with at least one embodiment of the present invention. Here again, mounting mechanism 120 is mounted, so as to be secured via snap-fit engagement, to a supporting structure 134, as described above with respect to the embodiment illustrated in FIGS. 2 and 3. In the present embodiment, the mounting mechanism 120 again includes a housing 124 defining an interior 126. In the present embodiment, the housing 124 includes a substantially cylindrical stem portion 128, a flange portion 130, and an end cap portion 132. End cap portion 132 further includes a pair of snapping mechanisms 133a-b for snap-fit engagement with the stem portion 128 when the sensing device 136 is positioned within the housing interior 126 and the mounting mechanism 120 is in its mounted position, ready for use. Sensing device 136 is again positioned within the interior 126 of housing 124 and is further secured via a press-fit, using housing extension rim 121. Here again although not shown, in an alternative embodiment the extension rim 121 can comprise a dove tail-type mechanism that could slidably engage a slot created in a surface of the sensing device 136. The light pipe 122 is coupled, as shown, to the end cap portion 132. In one embodiment, the light pipe 122 can be formed such that it is integral with the end cap portion 132.

In the present embodiment, the sensing device 136 is placed into position within the interior 126 of the housing 124 by removing end cap portion 132 and sliding, or otherwise positioning, the sensing device 136 into the interior of the housing. Advantageously, the flanged portion 130 includes stops 140, which serve to further secure the sensing device 136. The end cap portion 132, having the light pipe device 122, can then be positioned relative to the sensing device 136 as shown. Advantageously, ends 135a-b of snapping mechanisms 133a-b, respectively, and the at least one stop 140, abut the sensing device 136. In this way, thus the snapping mechanisms 133a-b and the stop surface 140 can be used to appropriately position the sensing device 136 within the interior 126 of the housing 124.

While the various figures illustrate the incorporation or use of a single light pipe for a given sensing device mounting mechanism, it should be understood that more than one light pipe device can be utilized, depending on the application at hand. Additionally, while the light pipe is positioned so as to protrude from second end of the housing, it should be understood that one or more light pipes can be mounted at a variety of locations on the mounting mechanism, e.g., at the first end or along the sides of the cylindrical stem portion.

While the mounting mechanism 12 can be constructed from a variety of materials, in one embodiment, the mechanism can comprise metallic material (e.g., aluminum), a molded plastic, and/or a molded polymeric material. In conjunction with the above, the sensing device mounting mechanism also in some embodiments can be mounted in a fixed, or substantially fixed, manner with respect to the supporting structure using, for example, one or more screws, bolts, an adhesive (or Velcro®) or any of a variety of other fastening devices or methodologies, albeit such fastening devices are not shown explicitly in the figures.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A sensing device mounting mechanism comprising:
    a housing having first and second ends, the housing being mountable to a supporting structure proximate the first end, the housing defining an interior for receiving and supporting a sensing device between the first and second ends, and
    a light pipe device coupled to the housing proximate the second end, the light pipe device for communicating a light signal at least one of from a location external to the housing to the sensing device and from the sensing device to the location exterior to the housing, and wherein the light pipe device includes a substantially cylindrical extension portion that extends outwardly from the housing and a frustoconical portion that protrudes into the interior of the housing.

2. The sensing device mounting mechanism of claim 1 wherein the housing further includes a stem portion and a flange portion extending from the stem portion and wherein the housing can be positioned onto to the supporting structure by passing the stem portion through an orifice in the support structure until the flange portion substantially abuts the supporting structure.

3. The sensing device mounting mechanism of claim 1, wherein the light pipe device serves to communicate the light signal from a light source supported by the sensing device to the location exterior to the housing, and wherein the location exterior to the housing is at least one of a first location at which an operator can view the light signal and a second location at which the light signal can be provided to an additional device.

4. The sensing device mounting mechanism of claim 1 wherein the housing further includes a snapping mechanism for securing the housing to the supporting structure via snap-fit engagement.

5. The sensing device mounting mechanism of claim 1 wherein sensing device is rotatably coupled to the housing.

6. The sensing device mounting mechanism of claim 1 wherein the housing is configured to be connected to the supporting structure via at least one of the following: a snapping mechanism, an adhesive, a screw, a bolt, Velcro®, and a pair of appendages that clamp onto the supporting structure.

7. The sensing device mounting mechanism of claim 1 wherein the housing further includes a sensing device extension rim for receiving and securing the sensing device within the interior via press-fit engagement.

8. The sensing device mounting mechanism of claim 1 wherein the sensing device located within the interior of the housing comprises a printed circuit board coupled to a plurality of components including a light emitting diode.

9. The sensing device mounting mechanism of claim 1 wherein the housing further includes a stem portion and a flange portion extending from the stem portion and wherein the stem portion further includes a main portion and a hinged portion that is hingedly coupled to the main portion.

10. The sensing device mounting mechanism of claim 9 wherein the hinged portion further comprises at least one snapping mechanism for snap-fit engagement with the main portion.

11. The sensing device mounting mechanism of claim 1 wherein the housing further comprises a stem portion having a plurality of interior snapping mechanisms and a flange portion having a plurality of interior snapping mechanisms, and wherein the stem portion interior snapping mechanisms and the flange portion interior snapping mechanisms engage complementary notches formed in the sensing device so as to secure the sensing device within the interior of the housing.

12. The sensing device mounting mechanism of claim 11 further comprising a spring positioned in overlay relationship with respect to the sensing device, and wherein the spring, when compressed, pushes the stem portion away from the supporting structure, and acts as a tensioning device to hold, in cooperation with the interior snapping mechanism, the sensing device and housing in a mounted position.

13. The sensing device mounting mechanism of claim 1 wherein the housing includes a stem portion, a flange portion extending from the stem portion, and an end cap portion, and wherein the end cap portion includes a pair of snapping mechanisms for snap fit engagement with the stem portion.

14. A sensing device mounting mechanism in combination with a sensing device, the combination comprising:
    a sensing device; and
    a sensing device mounting mechanism comprising:
        a housing having first and second ends, the housing being mountable to a support structure proximate the first end, the housing defining an interior between the first and second ends for receiving and supporting a sensing device, and
        a light pipe device coupled to the housing proximate the second end, the light pipe device for communicating light at least one of from the interior of the housing to an exterior of the housing, and from the exterior of the housing to the interior of the housing, and wherein the light pipe device includes a substantially cylindrical extension portion that extends outwardly from the housing and a frustoconical portion that protrudes into the interior of the housing.

15. The combination of claim 14 wherein the housing further includes a stem portion and a flange portion extending from the stem portion and wherein the mounting device housing can be coupled to the support structure by passing the stem portion through an orifice in the support structure until the flange portion substantially abuts the supporting structure.

16. The combination of claim 14 wherein the housing further includes a snapping mechanism for securing the mounting assembly to the support structure via snap-fit engagement.

17. The combination of claim 14 wherein the sensing device located within the interior of the housing comprises a printed circuit board coupled to a plurality of components including a light emitting diode.

18. The combination of claim 14 wherein the housing further includes a stem portion and a flange portion extending from the stem portion and wherein the stem portion further includes a main portion and a hinged portion that is hingedly coupled to the main portion.

19. The combination of claim 14 wherein the housing further comprises a stem portion having a plurality of interior snapping mechanisms and a flange portion having a plurality of interior snapping mechanisms, and wherein the stern portion interior snapping mechanisms and the flange portion interior snapping mechanisms engage complementary notches formed in the sensing device so as to secure the sensing device within the interior of the housing.

20. The combination of claim 14 wherein the housing includes a stem portion, a flange portion extending from the stem portion, and an end cap portion, and wherein the end cap portion includes a pair of snapping mechanisms for snap fit engagement with the stem portion.

21. A sensing device mounting mechanism comprising:
a housing having first and second ends, the housing being mountable to a support structure, the housing defining an interior for receiving and supporting a sensing device between the first and second ends and comprising:
- a stem portion, and
- a flange portion extending from the stem portion proximate the first end; and a light pipe device coupled to the housing proximate the second end; and wherein the housing can be mounted to the support structure by passing the stem portion through an orifice in the support structure until the flange portion substantially abuts the supporting structure, and wherein the light pipe device includes a substantially cylindrical extension portion that extends outwardly from the housing and a frustoconical portion that protrudes into the interior of the housing.

22. The sensing device mounting mechanism of claim 21 wherein the light pipe device is integral with the housing.

23. The sensing device mounting mechanism of claim 21 wherein the light pipe device magnifies the light from at least one of the light source and the sensing device and wherein at least one of the light source and the sensing device includes at least one of a liquid crystal display and a light emitting diode.

* * * * *